United States Patent [19]

Murthy

[11] Patent Number: 4,728,875
[45] Date of Patent: Mar. 1, 1988

[54] METHOD AND APPARATUS FOR MONITORING A LIQUID LEVEL

[75] Inventor: Ashok Murthy, Rochester, N.Y.
[73] Assignee: Allegheny Ludlum Corporation, Pittsburgh, Pa.
[21] Appl. No.: 921,715
[22] Filed: Oct. 20, 1986
[51] Int. Cl.[4] ............................................. G05D 9/00
[52] U.S. Cl. ..................................... 318/642; 164/4.1; 164/452; 164/457
[58] Field of Search ......................... 164/450, 451–453, 164/156, 4.1, 150, 154, 457; 116/227; 307/118; 318/642, 657, 638, 643

[56] References Cited

U.S. PATENT DOCUMENTS 3,181,361  5/1965  Bell ........................................ 318/642
4,600,844  7/1986  Atkins ..................................... 307/118

FOREIGN PATENT DOCUMENTS 6059513  12/1985  Japan .

Primary Examiner—William M. Shoop, Jr.
Assistant Examiner—D. Martin
Attorney, Agent, or Firm—Patrick J. Viccaro

[57] ABSTRACT

A method and apparatus are provided for monitoring the surface level of a liquid, such as molten metal, by moving first and second sensing electrodes vertically with respect to the surface level of the liquid, positioning the lower portion of the second electrode vertically displaced upwardly with respect to the lower portion of the first electrode, such that the amount of vertical displacement is directly related to the accuracy of determining the liquid level, generating an electrical signal as a function of each electrode position, then moving the first and second electrode vertically with respect to the surface level of the liquid in response to the electrical signal corresponding to each electrode, and thereafter determining the liquid level when the first electrode is in contact with the liquid and the second electrode is in noncontacting position above the liquid.

20 Claims, 2 Drawing Figures

METHOD AND APPARATUS FOR MONITORING A LIQUID LEVEL

BACKGROUND OF THE INVENTION

This invention relates to a method and apparatus for monitoring the surface level of a liquid using a contacting sensing means. More particularly, the invention relates to a method of using two movable electrodes for monitoring the surface level of a liquid, particularly useful with molten metal casting systems.

There are various methods known for sensing and measuring the liquid level on a continuous basis, generally in a contacting or noncontacting manner. Such systems have been proposed to measure the liquid level in a vessel, and particularly, of molten metal in a vessel, tundish, or casting mold.

Various noncontacting methods and devices may be based on eddy currents, laser beam reflections, and ultrasonics. When using eddy currents, variations induced within the coils of a sensing head either suspended above the liquid or incorporated in the main body of the vessel or casting mold itself is used. Another commonly proposed method employs laser beam reflections wherein a laser light is reflected off the surface of the liquid to a detector and measuring the relative angle between the laser and detector. When used with molten steel, however, the reflected light is disturbed due to the high temperature atmosphere, the turbulent state of the molten steel surface, and the flux powder normally applied to the exposed surface of the molten metal.

Another method which has been proposed is based on ultrasonics or sonic measurements produced by a transducer above the molten metal surface. Because of the high temperature atmospheres involved with the molten steel, both the laser method and ultrasonic method have large errors in measurement and cannot be used reliably.

Various contacting methods and apparatus have also been proposed. For example, it is known to use a spiral flow or a pressure in a bubble tube for measuring the level of the liquid metal. Still further, it has been proposed to use a single electrode for detecting the level of the molten metal; the position of the electrode depending upon the electrical resistance between the electrode and the molten steel.

As disclosed in Japanese Patent Publication No. 6059513, published Dec. 25, 1985, a method for detecting the position of the liquid surface is carried out by raising and lowering a single electrode at regular intervals in order to contact the liquid surface and thus measure the change in the position of the molten metal surface over time.

Although attempts have been made by another to use a fixed two-electrode probe system for monitoring the top of the pool of the liquid metal in the casting tundish, such a method was not able to dynamically track the position of the surface of the liquid metal and did not include a feedback controlled electrode system for monitoring the surface of the liquid metal.

While such methods and devices have been somewhat successful, they are either more expensive, less accurate, or not practical for use with molten metal or molten metal continuous casting operations.

What is needed is a method and apparatus for monitoring the surface level of a liquid, particularly molten metal, and more particularly molten metal having little or no slag layer. The method and apparatus should be suitable for use in the harsh environments of molten metal casting systems and be practical and yet inexpensive. The method and apparatus should be able to dynamically track the liquid surface and should be feedback responsive to monitor the liquid surface.

SUMMARY OF THE INVENTION

In accordance with the present invention, a method is provided for monitoring the surface level of a liquid which includes moving a first and second sensing means vertically with respect to the surface level of the liquid, positioning the lower portion of the second sensing means vertically displaced upwardly with respect to the lower portion of the first sensing means, generating an output signal as a function of each sensing means position, then moving the first and second sensing means vertically with respect to the surface level of the liquid in response to the output signal corresponding to each sensing means position, and thereafter determining the liquid level when the first sensing means is in contact with the liquid and the second sensing means is in noncontacting position above the liquid. The amount of vertical displacement between the lower portion of the first and second sensing means is directly related to the accuracy of determining the liquid level.

An apparatus is also provided including a first sensing means, a second sensing means, means for moving the sensing means vertically with respect to the surface level of the liquid, means for positioning the first and second sensing means with the lower portion of the second sensing means being vertically displaced upwardly with respect to the lower portion of the first sensing means, means for generating an output signal as a function of sensing means electrode position, and means for moving the sensing means vertically with respect to the surface level in response to the output signal corresponding to each sensing means position and determining the liquid level when the first sensing means is in contact with the liquid and the second sensing means is in a noncontacting position above the liquid.

DETAILED DESCRIPTION OF THE PREFERRED EMBODIMENTS

Figure 1:
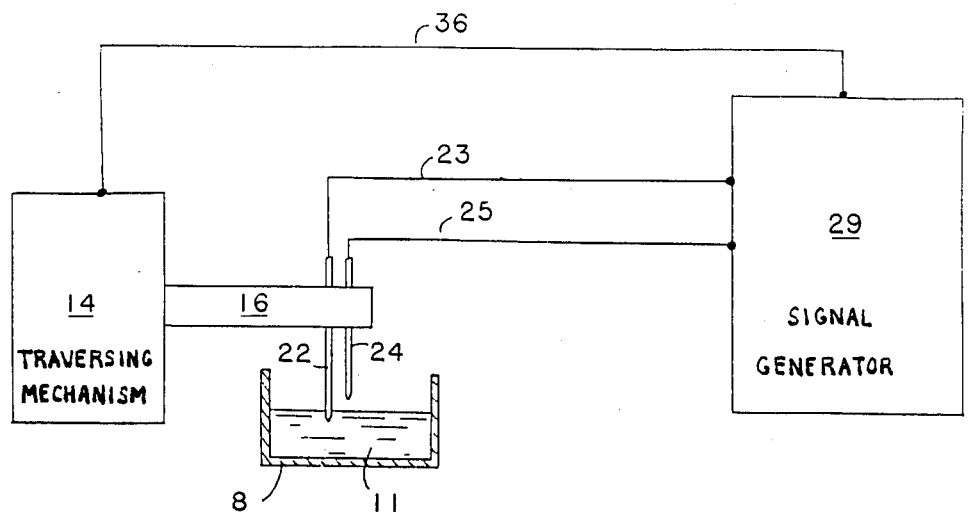
FIG. 1 is a schematic of an apparatus of the present invention.

FIG. 1 broadly shows the present invention to include first and second sensing means or probes 22 and 24, respectively, mounted in a means 16 for positioning the sensing means with respect to each other on a means 14 for moving the sensing means vertically with respect to the surface of liquid 11 in a vessel 8. Means 29 for generating an output signal from probes 22 and 24 as a function of position and means 36 for moving the probes in response to the output signal are also shown.

Sensing means 22 and 24 may be any of various sensing devices which are pneumatic, electric, or even mechanical. It is important, however, to the present claimed invention that two sensing means or devices be provided and that lower sensing portions of each be vertically displaced upwardly with respect to the other. The difference or amount of vertical displacement between the lower portions of the sensing means is determinative of the liquid level and the accuracy of measuring and maintaining the desired level.

Means 29 for generating the output signal and positioning and repositioning of the sensing means 22 and 24 in response thereto may be a single device, such as a programmable logic computer (PLC), or may include a combination of various devices to perform the function. A combination of devices may include relay control modules, solid state switching circuits, transistors and/or stepping motors, for example.

Figure 2:
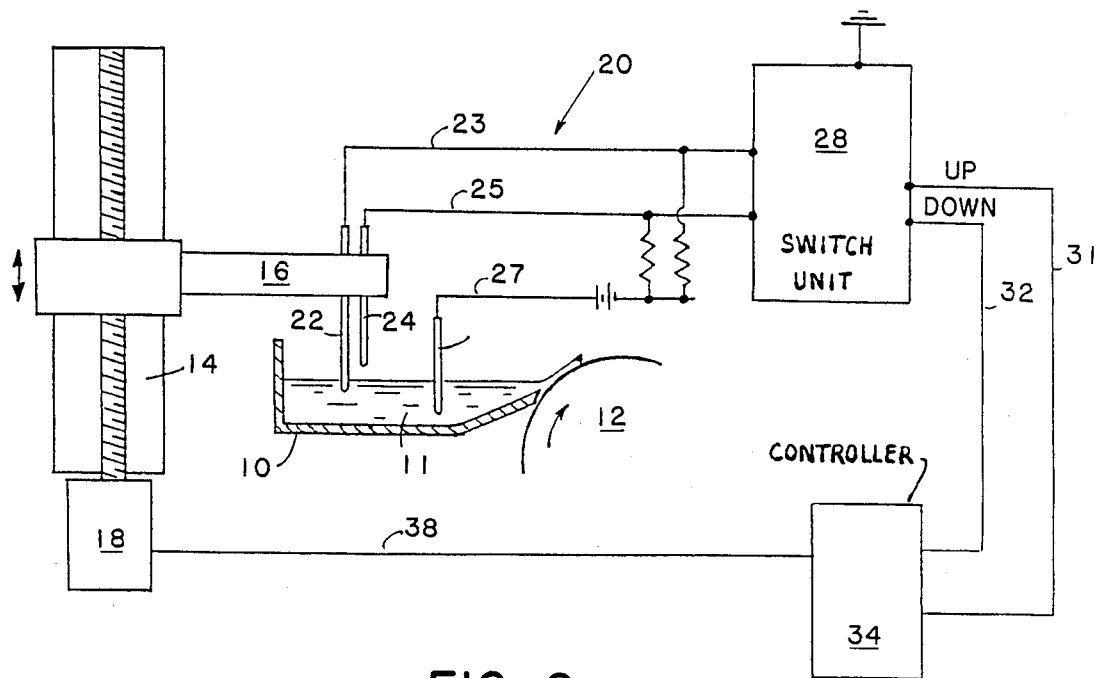
FIG. 2 is a schematic of another embodiment of an apparatus of the present invention.

FIG. 2 more particularly shows a casting system including a tundish 10 for casting a molten metal liquid 11 onto a moving substrate 12. The present invention is shown to include sensing means 22 and 24 which are electrodes mounted in a support unit 16 of traversing mechanism 14 for positioning the electrodes vertically with respect to the surface level of the liquid. Electrodes are connected electrically to a common ground electrode 26 in contact with the liquid as well as with electrical decoding and switching unit 28. In response to the electrical signal generated by the electrode position, the decoding and switching unit 28 generates an output signal through relays 34 to motor 18 for driving traversing mechanism 14 for raising and lowering electrodes 22 and 24.

The present invention includes two electrodes 22 and 24 which are positioned such that the lower portion or tip of second electrode 24 is vertically displaced upwardly with respect to the lower portion or tip of first electrode 22. Preferably, the same vertical displacement is maintained between the lower portions of each electrode throughout the monitoring operation of the present invention. The electrodes should be high temperature resistant and resistant to corrosion once subjected to molten metal. The probes do not have to be made of the same material. Each electrode may be made of cermet, which may be selected from a group of ceramic-metal composite materials, or any of various other materials including iron, alumina-graphite or alumina-molybdenum alloys. Such material should be resistant to corrosion by liquid metal and slag and allow sufficient flow of electrical current. Material and dimensions of the probe may be selected to minimize the buildup of frozen metal and oxides.

Traversing mechanism 14 may be of any conventional type, including a screw-type mechanism or an endless chain or belt. What is important is that the traversing mechanism be able to provide smooth and uniform movement in order to be able to position the electrodes precisely with very close tolerance. Mechanism 14 may include a support arm 16 in which electrodes 22 and 24 may be mounted. Support 16 should consist of an electrically insulating material in order to insulate the electrodes from each other and it should also be suitable for resisting high temperatures and molten metal when used in conjunction with molten metal casting systems. Traversing mechanism 14 may be driven by a conventional motor 18, such as a direct current or alternating current motor or stepping motor. Preferably, the motor should be suitable for driving either forward or backward as necessary, which may depend upon the polarity of the voltage applied to it, in order that the support arm 16 and electrodes 22 and 24 may be moved vertically upward or downward with respect to the liquid surface.

Electrical circuit 20 includes electrodes 22 and 24 which are electrically connected through conductors 23 and 25, respectively, to the decoding and switching unit 28. Both electrodes may also be electrically connected through resistors and conductor 27 to a common ground electrode 26. Common electrode 26 should always be maintained in the liquid in generally a fixed position. Electrodes 22 and 24 are movable vertically with respect to the liquid as well as with respect to common electrode 26. Voltage signals are generated as a function of the position of electrodes 22 and 24 with respect to the liquid surface. Three different electrical signals could be generated, depending on the position of the electrodes. For example, one signal would indicate that both electrodes 22 and 24 are above the liquid surface. Another signal would be generated when both electrodes 22 and 24 are in contact with the liquid. A third signal would be generated when the first electrode 22, particularly at the lower portion thereof, is in contact with the liquid and the lower portion of the second electrode 24 is above the surface of the liquid. Such signals are used to determine the level of the liquid. In the condition when the first electrode is in contact and the second electrode is in a noncontacting position above the liquid, the amount of vertical displacement between the lower tips of each electrode is directly related to the accuracy of determining the liquid level. Such signals are also determinative of any adjustments to the positions of the electrodes in order to determine the liquid level or in allowing the liquid level to change to a predetermined position by suitable feedback signals.

Decoder and switching unit 28 is electrically connected to electrodes 22 and 24 for receiving a voltage signal. Unit 28 may be an integrated circuit, a computer with algorithm, or a standard logic circuit. When either electrode touches the liquid surface, the voltage on that line goes up to a nominal high voltage, such as 5 volts. Both conductor lines 23 and 25 going into unit 28 form a binary digital signal level input to a decoder circuit within the unit. Preferably, the circuit includes transistor-transistor logic (TTL) which has a common characteristic of design to operate at low voltage, particularly about 5 volts. The decoder circuit interprets the binary input and converts that to one of several outputs. Preferably, the decoder and switching unit 28 may provide different electrical outputs which may correspond to signals for driving the motor 18 for moving the electrodes upwardly or downwardly or a NULL signal for not driving the motor at all. A MOTOR UP signal may be given when both electrodes 22 and 24 are in the liquid. A MOTOR DOWN signal may be given when both electrodes 22 and 24 are above and out of the liquid. A signal to not drive the motor may be given when the first electrode 22 is in the liquid and second electrode 24 is above the liquid.

Decoding and switching unit 28 may include a set of switches which are activated by the INPUT signal from conductor lines 23 and 25 from electrodes 22 and 24, respectively. Such switches may be of the transistor type having an ON or OFF condition, depending on whether the input voltage is high or low depending on whether the electrode is in contact or noncontact with the liquid. Such switches are of a conventional type and suitable switches are of the Mosfet-type transistor devices, which are metal oxide field effect transistors.

Controller unit 34 is electrically connected to decoding and switching unit 28 by electrical conduits 31 and 32. Controller unit 34 may include a set of four solid-state relays which are activated by the OUTPUT signal from unit 28 in order to signal motor 18 to drive traversing mechanism 14 for moving electrodes 22 and 24 vertically upwardly or downwardly with respect to the liquid surface. Instead of relay control modules, the controller unit 34 may include other suitable devices such as a solid state switching circuit or a stepping motor controller.

In the operation of the present invention, electrodes 22 and 24 would be moved vertically with respect to the surface level of the liquid, such as molten metal in vessel 10, shown in FIG. 2 through the action of traversing mechanism 14 and supporting arm 16. The lower portions or tips of electrodes 22 and 24 are vertically displaced with respect to each other in order that the liquid level may be determined. When electrical circuit 20 is operational, an electrical signal is generated as a function of the electrode position. When neither electrode 22 or 24 is touching the liquid metal, the voltage signal to unit 28 activates one of the transistor switches therein to send an OUTPUT signal along electrical conductor 32 to controller unit 34 which thereupon sends a signal to motor 18 to drive traversing mechanism downwardly. When electrode 22 is in contact with the liquid and electrode 24 is in non-contacting position above the liquid, the voltage signal to unit 28 may drive only a status indicator with no electrical signal being sent to relay 34 for activating motor 18. In the event the liquid level rises and becomes in contact with both electrodes 22 and 24, then the electrical signal provided to unit 28 through the transistor switches therein will send an OUTPUT signal to controller unit 34 to activate one of the solid-state relays, for example, and thereby send a signal to motor 18 for driving traversing mechanism 14 for raising electrodes 22 and 24 vertically with respect to the surface level of the liquid and continue to do so until electrode 24 is in a noncontacting position above the liquid. At that time, the signal to decoding and switching unit 28 will indicate that no motor response is necessary to indicate the level of the liquid. A feedback response may be used to tell the molten metal supplier to provide less metal until the liquid level is lowered to the desired level. Electrical signals would also be used to move the probes as explained above.

In order to better understand the present invention, the following example is presented:

An apparatus comprising the unit set forth in FIG. 2 was assembled and used for measuring and monitoring the level of molten metal during a continuous casting operation of casting thin strip material using a tundish 10 and a rotating casting substrate wheel 12 for casting steel. Two cermet electrodes of about 3 inches long by ¼ inch in diameter were electrically insulated from and mounted on a screw-type traversing mechanism having a support arm made of steel. A 5-volt power supply unit was electrically connected to decoding and switching unit 28 for driving the internal Mosfet transistor-type switches. Controller unit 34 was a relay unit including two pairs of solid state relays. Each pair was connected to a voltage source as well as unit 28 for receiving the OUTPUT signal. Transistor type switches in unit 28 completed a circuit for the control input side of the pairs of solid-state relays. Polarity of the voltage applied to motor 18 to drive the motor in different directions was determined by the OUTPUT signal from unit 28 sent along electrical conductor 31 or 32.

In use, the entire system of the present invention was shown to be well behaved, both in terms of speed and accuracy, in monitoring the level of the molten metal in the tundish. The status of each of the two electrodes with respect to contact or noncontact with the liquid metal pool was monitored by the logic circuit which fed back instructions to the motor drive to move the traversing mechanism either up or down so that at equilibrium one electrode remained in the metal pool while the other remained above it. When the equilibrium state was achieved, a measurement of the position of the traversing mechanism gives the relative position of the metal pool surface. Such measurements were taken over a 20 minute duration and were accurate to within + or −0.05 inch.

It is also preferred that the system exhibit appropriate signal conditioning and isolation as may be conventional in order to optimize the system response.

As was the objective of the present invention, a method and apparatus are provided that will dynamically track the position of a liquid surface, in order to provide information on the position of the surface in real time. Furthermore, the method and apparatus provide a relatively low cost system for making such measurements in molten metal wherein the environments of high temperature and resistance to molten metal corrosion are required.

Although preferred and alternative embodiments have been described, it will be apparent to one skilled in the art that changes can be made therein without departing from the scope of the invention.

What is claimed is:

1. A method of monitoring the surface level of a liquid, the method comprising:
   moving a first sensing means and a second sensing means vertically with respect to the surface level of the liquid;
   positioning the lower portion of the second sensing means vertically displaced upwardly with respect to the lower portion of the first sensing means, the amount of vertical displacement being directly related to the accuracy of determining the liquid level;
   generating an output signal as a function of each sensing means positon;
   then moving the first and second sensing means vertically with respect to the surface level of the liquid in response to the output signal corresponding to each sensing means position; and
   determining the liquid level when the first sensing means is in contact with the liquid and the second sensing means is in noncontacting position above the liquid.

2. The method of claim 1 further comprising moving the first and second sensing means together while maintaining the relative vertical displacement between the sensing means.

3. The method of claim 1 further comprising generating an output signal as a function of each sensing means being either in contacting or noncontacting relation with the liquid.

4. The method of claim 1 further comprising:
   again moving the first and second sensing means vertically with respect to the surface level of the liquid to a new position; and
   allowing the liquid level to change until the first sensing means is in contact with the liquid and the second sensing means is in noncontacting position above the liquid.

5. The method of claim 4 further comprising allowing the liquid level to change in response to the output signal from the first sensing means and the second sensing means.

6. The method of claim 1 further comprising adjusting the vertical displacement of the lower portion of the second sensing means with respect to the lower portion of the first sensing means.

7. The method of claim 1 wherein the first and second sensing means are electrodes for generating a voltage output signal as a function of each electrode position.

8. A method of monitoring the surface level of a liquid, the method comprising:
   positioning the lower portion of a second electrode vertically displaced upwardly with respect to the lower portion of a first electrode, the amount of vertical displacement being directly related to the accuracy of determining the liquid level;
   moving the first electrode and the second electrode together vertically with respect to the surface level of the liquid while maintaining the relative vertical displacement between the electrodes;
   generating an electrical signal as a function of each electrode position being either in contacting or noncontacting relation with the liquid;
   then moving the first and second electrode vertically with respect to the surface level of the liquid in response to the electrical signal corresponding to each electrode position; and
   determining the liquid level when the first electrode is in contact with the liquid and the second electrode is in noncontacting position above the liquid.

9. The method of claim 8 further comprising:
   again moving the first and second electrodes vertically with respect to the surface level of the liquid to a new position; and
   allowing the liquid level to change in response to the output signal from the first and second electrodes until the first electrode is in contact with the liquid and the second electrode is in noncontacting position above the liquid.

10. An apparatus for monitoring the surface level of a liquid, the apparatus comprising:
    a first sensing means;
    a second sensing means;
    a means for moving the first and second sensing means vertically with respect to the surface level of the liquid;
    a means for positioning the first and second sensing means with the lower portion of the second sensing means being vertically displaced upwardly with respect to the lower portion of the first sensing means;
    means for generating an output signal as a function of each sensing means position; and
    means for moving the first and second sensing means vertically with respect to the surface level of the liquid in response to the output signal corresponding to each sensing means position and for determining the liquid level when the first sensing means is in contact with the liquid and the second sensing means is in a noncontacting position above the liquid.

11. The apparatus of claim 10 further comprising means for moving the sensing means together while maintaining the relative vertical displacement between the sensing means.

12. The apparatus of claim 10 further comprising means for generating an output signal as a function of each sensing means position being either in contacting or noncontacting relation with the liquid.

13. The apparatus of claim 10 further comprising means for moving the first and second sensing means vertically with respect to the surface level of the liquid to a new position for allowing the liquid level to change until the first sensing means is in contact with the liquid and the second sensing means is in a noncontacting position above the liquid.

14. The apparatus of claim 10 further comprising means for allowing the liquid level to change in response to the output signal from the first and second sensing means.

15. The apparatus of claim 10 further comprising means for adjusting the vertical displacement between the lower portions of the sensing means.

16. The apparatus of claim 10 wherein the first and second sensing means are electrodes for generating a voltage output signal as a function of each electrode position.

17. The apparatus of claim 16 further comprising a logic circuit means for decoding the electrical position signals of the electrodes and for generating output signals which are determinative of any adjustment of the positions of the electrodes.

18. The apparatus of claim 16 wherein the electrodes are molten metal resistant.

19. An apparatus for monitoring the surface level of a liquid, the apparatus comprising:
    a first electrode;
    a second electrode;
    a means for positioning the electrodes with the lower portion of the second electrode being vertically displaced upwardly with respect to the lower portion of the first electrode;
    a means for moving the electrodes together vertically with respect to the surface level of the liquid while maintaining the relative vertical displacement between the electrodes;
    logic circuit means for generating an electrical output signal as a function of each electrode position being either in contacting or noncontacting relation with the liquid and for decoding the electrical position signals of the electrodes and for generating a second output signal which is determinative of any adjustment of the positions of the electrodes; and
    means for moving the first and second electrode vertically with respect to the surface level of the liquid in response to the electrical signal corresponding to each electrode position and for determining the liquid level when the first electrode is in contact with the liquid and the second electrode is in a noncontacting position above the liquid.

20. The apparatus of claim 19 further comprising means for again moving the first and second electrodes vertically with respect to the surface level of the liquid to a new position for allowing the liquid level to change in response to the output signal from the first and second electrodes until the first electrode is in contact with the liquid and the second electrode is in a noncontacting position above the liquid.

* * * * *

UNITED STATES PATENT OFFICE
CERTIFICATE OF CORRECTION

Patent No. 4,728,875　　　　　　　　　　Dated　March 1, 1988

Inventor(s) Ashok Murthy

It is certified that error appears in the above-identified patent and that said Letters Patent are hereby corrected as shown below:

In claim 7, line 2, delete the phrase "electrodes for".

Signed and Sealed this

Eighteenth Day of October, 1988

*Attest:*

DONALD J. QUIGG

*Attesting Officer*　　　　*Commissioner of Patents and Trademarks*